United States Patent [19]

Franz et al.

[11] Patent Number: 5,308,705
[45] Date of Patent: * May 3, 1994

[54] WATER REPELLENT SURFACE TREATMENT

[75] Inventors: Helmut Franz, Pittsburgh; George B. Goodwin, Mars, both of Pa.

[73] Assignee: PPG Industries, Inc., Pittsburgh, Pa.

[*] Notice: The portion of the term of this patent subsequent to Jan. 8, 2008 has been disclaimed.

[21] Appl. No.: 589,235

[22] Filed: Sep. 28, 1990

Related U.S. Application Data

[63] Continuation-in-part of Ser. No. 503,587, Apr. 3, 1990, Pat. No. 4,983,459.

[51] Int. Cl.$^5$ ............................................. B32B 27/00
[52] U.S. Cl. ................................. 428/421; 106/287.13; 106/287.14; 106/287.27; 106/901; 428/426; 428/432; 428/461
[58] Field of Search ............... 428/410, 421, 426, 432, 428/413, 414, 416, 423.1, 425.8, 457, 461; 427/389.7, 387, 388.1, 393.5; 106/287.13, 287.14, 287.27, 287.28, 901

[56] References Cited

U.S. PATENT DOCUMENTS

| | | | |
|---|---|---|---|
| 4,263,371 | 4/1981 | Franz | 428/432 |
| 4,276,350 | 6/1981 | Franz | 428/410 |
| 4,301,197 | 11/1981 | Franz et al. | 427/353 |
| 4,529,657 | 7/1985 | Franz | 428/410 |
| 4,983,459 | 1/1991 | Franz | 428/410 |

FOREIGN PATENT DOCUMENTS 0222272  12/1984  Japan .............................. 427/389.7

*Primary Examiner*—Paul J. Thibodeau
*Assistant Examiner*—H. Thi Le
*Attorney, Agent, or Firm*—Donna L. Seidel

[57] ABSTRACT

A method and article are disclosed wherein a metal, polymeric or inorganic coated substrate is provided with a durable non-wetting surface by treatment with a perfluoroalkyl alkyl silane and a fluorinated olefin telomer.

10 Claims, No Drawings

WATER REPELLENT SURFACE TREATMENT

CROSS REFERENCE TO RELATED APPLICATION

This application is a continuation-in-part of U.S. application Ser. No. 07/503,587 filed Apr. 3, 1990, now U.S. Pat. No. 4,983,459.

BACKGROUND

The present invention relates generally to the art of surface treatment and, more particularly, to the art of producing a water repellent surface on various substrates.

THE PRIOR ART

U.S. Pat. No. 4,263,371 to Franz teaches a method for reducing the surface energy of a glass article by chemisorption of an organotin compound at a temperature insufficient to thermally decompose the compound. Such compounds as methyltin chloride are shown to increase the contact angle of a drop of water on the surface from 10° for untreated glass to 45° to 90° for various compounds.

U.S. Pat. No. 4,276,350 to Franz discloses a method for reducing the reactivity of a glass surface by blocking reactive sites such as silanol groups at the glass surface with a molecular layer of fluorocarbon. The method involves absorbing multivalent cations at the glass surface to provide anchoring sites for the chemisorption of otherwise nonreactive fluorocarbons.

U.S. Pat. No. 4,301,197 to Franz et. al. discloses the formation of highly efficient release surfaces on glass substrates by treatment of the glass with poly alkyl hydrogen siloxane. The treated glass surface effectively releases such materials as polycarbonates, acrylics, and polyurethanes contacted in press polishing or laminating processes.

U.S. Pat. No. 4,529,657 to Franz discloses reducing the surface energy of glass by absorbing multivalent cations such as chromium onto a glass surface, then treating the surface with an aqueous solution of an alkali metal alkylate such as sodium stearate or oleate to bond the long chain paraffinic or olefinic acid anion to the glass surface by ionic bonding of the alkylate anion to the absorbed multivalent cation, thereby rendering the glass surface non-wettable and lubricated.

SUMMARY OF THE INVENTION

The present invention provides a substrate surface with high water repellancy and high lubricity. Durable water and dirt repellency of a substrate surface are provided by applying to the substrate surface a select combination of fluorinated compounds. High water repellency is provided by perfluoroalkylsilanes which bond to the substrate surface, while high lubricity is provided by addition of fluorinated olefin telomers.

DESCRIPTION OF THE PREFERRED EMBODIMENT

A perfluoroalkyl alkyl silane is combined with a fluorinated olefin telomer to produce the compositions of the present invention. The silane/olefin composition is preferably employed as a solution, preferably in a fluorinated solvent. The solution of the present invention is applied to a substrate surface by any conventional technique such as dipping, flowing, wiping or spraying. The solvent is evaporated and the composition forms a durable, non-wetting, lubricating surface.

Preferred perfluoroalkyl alkyl silanes have the general formula $R_nR'SiX_{4-n}$, wherein R is a perfluoroalkyl radical, n is preferably 1, R' is an alkyl, preferably ethyl, vinyl or propyl, and X is preferably a radical such as alkyl, halogen, and/or alkoxy. Preferred perfluoroalkyl radicals range from $CF_3$ to $C_{30}F_{61}$, preferably $C_6$ to $C_{16}$, and most preferably $C_8$ to $C_{10}$. R' is preferably ethyl. Preferred radicals for X include chloro, iodo, methyl, methoxy, ethoxy and acetoxy radicals. Preferred perfluoroalkyl ethyl silanes in accordance with the present invention include perfluoroalkyl ethyl-trichlorosilane, perfluoroalkyl ethyl-trimethoxysilane, perfluoroalkyl ethyl-dichloro(methyl)silane and perfluoroalkyl ethyl-diethoxy(methyl)silane. These perfluoroalkyl ethyl silanes appear to react with bonding sites at the substrate surface on a molecular basis. There does not appear to be polymerization or crosslinking. Strong surface bonding of the perfluoroalkyl ethyl silanes produces a substrate surface which exhibits a high contact angle with a drop of water, indicating high water repellency. The fluorinated olefin telomer, which does not on its own bond to the substrate surface, but which is bonded in combination with the perfluoroalkyl silane, provides lubricity to promote dirt repellency. The olefin structure provides for crosslinking to produce a durable surface. Preferred olefin telomers have the general formula $C_mF_{2m+1}CH=CH_2$ wherein m may range from 1 to 30. The more preferred olefin telomers are a mixture of compounds of the above formula wherein m ranges from 1 to 16, preferably 4 to 10.

Suitable solvents include isopropanol, ethanol, hexane, heptane, acetone, toluene and naphtha. Preferred solvents are fluorinated hydrocarbon solvents such as trichlorotrifluoroethane, and methylene chloride, and perfluorinated organic compounds such as perfluorocarbons. Concentrations of about 0.005 to 5, preferably about 0.05 to 2.5, percent of each component are preferred.

The solvent is preferably evaporated simply by drying in air at ambient temperature. The composition may be cured by heating the treated surface. A cure cycle of about 200° F. (about 93° C.) for about 30 minutes is suitable. Higher temperatures and shorter heating times may be more efficient. A cure cycle of 2 to 5 minutes at 400° to 500° F. (about 204° to 260° C.) may be preferred, particularly about 3 minutes at about 470° F. (about 243° C.).

The contact angles recited herein are measured by the sessile drop method using a modified captive bubble indicator manufactured by Lord Manufacturing, Inc., equipped with Gartner Scientific Goneometer optics. The surface to be measured is placed in a horizontal position, facing upward, in front of a point source light such as a slide projector lamp. A drop of water is placed on top of the surface in front of the light source so that the contours of the sessile drop can be viewed and the contact angle measured through a goneometer telescope equipped with circular protractor graduation.

The present invention will be further understood from the descriptions of specific examples which follow.

EXAMPLES I TO III

A solution is prepared comprising 2.5 grams of perfluoroalkyl ethyl trichlorosilane and 2.5 grams of fluorinated olefin telomer in 95 grams of Freon TF solvent, available from DuPont. The perfluoroalkyl ethyl trichlorosilane composition comprises a range of perfluoroalkyl radicals $CF_3(CF_2)_n$ wherein the average n=9.0 and the approximate distribution is $C_6$=6 percent, $C_8$=50 percent, $C_{10}$=29 percent, $C_{12}$=11 percent and $C_{14+}$=4 percent. The fluorinated olefin telomer has a similar distribution with $C_4$=4 percent, $C_6$=35 percent, $C_8$=30 percent, $C_{10}$=17 percent, $C_{12}$=8 percent and $C_{14+}$=6 percent. This solution is Treatment A. A solution of the same perfluoroalkyl ethyl trichlorosilane and fluorinated olefin telomer (2.5 grams of each) is prepared in a perfluorinated solvent, Fluorinert FC-77 from 3M. This solution is Treatment B. Metal plates measuring 6×6 inches (about 15×15 centimeters) are cleaned in dilute hydrochloric acid, washed with isopropanol and water, rinsed with deionized water and dried in air. The above solutions are applied with a cotton pad, and the excess removed with isopropanol. The contact angles of the treated surfaces are compared with the contact angles of untreated surfaces in the following table.

TABLE I

| Example | Metal | Contact Angle (°) | | |
|---|---|---|---|---|
| | | Untreated | Treatment A | Treatment B |
| I | galvanized steel | 71 | 90 | 84 |
| II | stainless steel | 77 | 110 | 112 |
| III | aluminum | 78 | 107 | 102 |

Chrome plate, copper and brass do not show similar increases in contact angle. This is believed to be a result of the absence of a surface oxidation layer with which the silane can bond. Steel and aluminum both comprise a durable, coherent metal oxide skin which is believed to react with the silane to yield a water-repellent surface.

EXAMPLES IV TO VI

The above Treatment A solution is applied to the surfaces of steel panels coated with three polymer topcoats used as automotive parts finishes as in the previous examples. Another set of polymer coated steel panels is treated with a solution similar to Treatment A except that half of the olefin is replaced with perfluoroiodide $CF_3(CF_2)_nI$, wherein n is from about 4 to 14, mostly 6 to 10 in a similar distribution as the silane and olefin. This is Treatment C. The contact angles are compared in the following table.

TABLE II

| Example | Polymer | Contact Angle (°) | | |
|---|---|---|---|---|
| | | Untreated | Treatment A | Treatment C |
| IV | epoxy | 75 | 92 | 112 |
| V | melamine crosslinked polyurethane | 73 | 96 | 105 |
| VI | acrylic melamine | 74 | 82 | 110 |

EXAMPLES VII TO X

Various inorganic coatings are deposited on glass substrates. The inorganic coated surfaces are then wiped with a solution of Treatment A as in previous examples. The contact angles are compared in the following table.

TABLE III

| Example | Coating | Contact Angle (°) | |
|---|---|---|---|
| | | Untreated | Treatment A |
| VI | sputtered tin oxide | 54 | 106 |
| VII | sputtered indium/tin oxide | 55 | 104 |
| VIII | sputtered antimony/tin oxide | 44 | 109 |
| IX | pyrolytic chrome/iron/cobalt oxide | 64 | 110 |
| X | pyrolytic tin oxide | 30 | 108 |

A sputtered low emissivity coating was damaged by Treatment A. It is believed that the silver layer in such a coating is not stable in the presence of chloride.

The above examples are offered to illustrate the present invention. Various perfluoroalkyl silanes, fluorinated olefin telomers, solvents and concentrations may be applied by any conventional technique, and cured at suitable temperatures for adequate times to provide durable non-wetting surfaces to any of a variety of substrates, as well as other inorganic surfaces such as metals, ceramics, enamels, and metal or metal oxide films. The treated substrates of the present invention is especially suitable in automobile and aircraft parts as well as in building components.

We claim:

1. An article comprising a substrate at least a portion of the surface of which is treated with a composition comprising:
   a. a perfluoroalkyl alkyl silane; and
   b. a fluorinated olefin telomer, wherein the substrate is uncoated or inorganic coated and selected from the group consisting of metals, polymers, ceramics and enamels.

2. An article according to claim 1, wherein said perfluoroalkyl alkyl silane is selected from compounds having the general formula $R_nR'SiX_{4-n}$, wherein R is a perfluoroalkyl radical, R' is an alkyl radical, n is less than 4, and X is a radical selected from the group consisting of alkyl, halogen, alkoxy and acetoxy radicals.

3. An article according to claim 2, wherein said perfluoroalkyl radical is selected from the group consisting of $CF_3$ to $C_{30}F_{61}$.

4. An article according to claim 3, wherein said perfluoroalkyl radical is selected from the group consisting of $C_6F_{13}$ to $C_{16}F_{33}$.

5. An article according to claim 4, wherein said perfluoroalkyl radical is selected from the group consisting of $C_8F_{17}$ to $C_{10}F_{21}$.

6. An article according to claim 2, wherein R' is selected from the group consisting of ethyl, vinyl and propyl.

7. An article according to claim 3, wherein X is selected from the group consisting of chloro, iodo, methyl, methoxy, ethoxy and acetoxy.

8. An article according to claim 4, wherein said perfluoroalkyl alkyl silane is selected from the group consisting of perflouroalkyl ethyl-trichlorosilane, perfluoroalkyl ethyl-trimethoxysilane, perfluoroalkyl ethyl dichloro(ethyl)silane and perfluoroalkyl ethyl-diethoxy(methyl)silane, wherein said fluorinated olefin telomer is selected from the group consisting of $C_mF_{2m+1}CH=CH_2$, wherein m is from 1 to 30.

9. An article according to claim 8, wherein m is from 1 to 16.

10. An article according to claim 9, wherein m is from 4 to 10.

* * * * *